US007068768B2

(12) United States Patent
Barnes

(10) Patent No.: US 7,068,768 B2
(45) Date of Patent: Jun. 27, 2006

(54) METHOD FOR POPULATING A CALLER'S INFORMATION TO A HOST-BASED ADDRESS BOOK

(75) Inventor: Michaela Ann Beeby Barnes, Bethesda, MD (US)

(73) Assignee: America Online, Inc., Dulles, VA (US)

( * ) Notice: Subject to any disclaimer, the term of this patent is extended or adjusted under 35 U.S.C. 154(b) by 261 days.

(21) Appl. No.: 10/354,509

(22) Filed: Jan. 29, 2003

(65) Prior Publication Data
US 2004/0146150 A1 Jul. 29, 2004

(51) Int. Cl.
*H04M 1/56* (2006.01)
*H04M 3/42* (2006.01)
(52) U.S. Cl. .......................... 379/142.15; 379/211.02; 379/215.01
(58) Field of Classification Search ........... 379/142.15, 379/142.04, 142.06, 142.07, 142.08, 142.1, 379/142.11, 142.17, 142.18, 215.01, 211.02
See application file for complete search history.

(56) References Cited

U.S. PATENT DOCUMENTS

| 5,737,395 | A | 4/1998 | Irribarren | 379/88 |
|---|---|---|---|---|
| 5,867,495 | A | 2/1999 | Elliott et al. | 370/352 |
| 5,999,525 | A | 12/1999 | Krishnaswamy et al. | 370/352 |
| 6,161,134 | A | 12/2000 | Wang et al. | 709/220 |
| 6,247,043 | B1 | 6/2001 | Bates et al. | 709/200 |
| 6,332,163 | B1 | 12/2001 | Bowman-Amuah | 709/231 |
| 6,404,762 | B1 | 6/2002 | Luzeski et al. | 370/352 |
| 6,430,177 | B1 | 8/2002 | Luzeski et al. | 370/356 |
| 6,442,251 | B1 | 8/2002 | Maes et al. | 379/93.23 |
| 6,466,654 | B1 | 10/2002 | Cooper et al. | 379/88.01 |
| 6,738,462 | B1 * | 5/2004 | Brunson | 379/142.06 |
| 2002/0126814 | A1 * | 9/2002 | Awada et al. | 379/142.01 |
| 2003/0147518 | A1 * | 8/2003 | Albal et al. | 379/207.15 |
| 2003/0215078 | A1 * | 11/2003 | Brahm et al. | 379/211.02 |

FOREIGN PATENT DOCUMENTS

EP 964 343 12/1999

OTHER PUBLICATIONS

Dalgic, Ismail et al.; *True Number Portability and Advanced Call-Screening in a SIP-Based IP-Telephony System*; IEEE Communications Magazine.
Hosaya, Haruo et al.; *Xduce: An XML Processing Language (Preliminary Report)*; Dec. 2, 1999; Department of CIS.
Kautz, Henry et al.; *Agent Amplified Communication*; 1996; AAAI-96.
Kougiouris, P.; *Programming Mobile Phones*; Sep. 2001; Dr. Dobb's Journal.
Asano, H. et al.; *Extraction of Sender Information from E-mails Based on Local Pattern Matching of Signatures and its Application to Address Book Management*; Jul. 1998; The Information Processing Society of Japan.

(Continued)

*Primary Examiner*—Barry Taylor
(74) *Attorney, Agent, or Firm*—Michael A. Glenn; Glenn Patent Group

(57) ABSTRACT

A method and apparatus is provided to populate a caller's information to a host-based address book automatically or by a single click on a virtual button included in a popup window or by a series of simple commands.

22 Claims, 6 Drawing Sheets

OTHER PUBLICATIONS

Magnanelli, M. et al.; *A Web Agent for the maintenance of a Database of Academic Contacts*; Jul. 30, 1998; Institute for Information Systems.

Narayanaswamy, S.; *Combining Data and Voice Communications on Digital Wireless Networks*; Bell Laboratories.

Perkins, Charles; *Mobile Networking in the Internet*; 1998; Baltzer Science Publishers.

Reichenbacher, Tumasch; *The World in your Pocket—Towards a Mobile Cartography*; Technical University of Munich.

Signer, Beat et al.; *Aural Interfaces to Databases Based on Voicemail*; 2002; www.globis.ethz.ch/publications/docs/2002a/sngh-vdb.ps.gz.

Wedlund, Tommy; *Global Product Development Supported by Groupware*; Product Models 2000.

Whittaker, Steve; *Managing Long Term Communications; Conversation and Contact Management*; AT&T Labs Research.

Yankelovich, Nicole; *SpeechActs & The Design of Speech Interfaces*; 1994; ACM Conference.

* cited by examiner

METHOD FOR POPULATING A CALLER'S INFORMATION TO A HOST-BASED ADDRESS BOOK

BACKGROUND OF THE INVENTION

1. Technical Field

The invention relates generally to Internet communication technology. More particularly, the invention relates to a method and apparatus for populating a caller's identification information to a host-based address book by one or more commands.

2. Description of the Prior Art

Traditionally, if a telephone receiver wants to get a caller's information such as name, telephone number, city and state, etc., he needs to ask the receiver and write down the information manually. "Caller ID" and "Internet Caller ID" technologies have fundamentally changed this situation. As FIG. 1A shows, a regular Caller ID 103 is a device connected to a telephone. When the caller 101 called the receiver 102, the Caller ID 106 displays the caller's telephone number. Using Caller ID, the receiver can recognize who is calling before he decides to pick up the phone. This also works for intra switch. For example, when a call is placed from two people off the same local switch, just like two neighbors, the Caller ID information is still passed.

FIG. 1B illustrates an Internet Caller ID model. When a caller 101 called the receiver 102 while the receiver is online, the Internet Caller ID 104 pops up a message 105 to the receiver 102. The receiver may have a predetermined period of time, 24 seconds or 4 ring cycles for example, to decide to handle the call. He can decide to answer it, or ignore it, or write down the caller's name and phone number and call her later. If the receiver 102 did not take the call within the predetermined period of time, the caller 101 would be sent to a voice mail if the receiver has one.

America Online has developed Internet based telephone technologies called AOL Call Alert (ACA) and AOLHome Voicemail (VOX) which provide various online services including a screen popup showing the number of an incoming call, the name associated with the caller, and the city and state. While a user is online, if a caller calls the user, ACA pops up a message window showing the caller's information. The user may take the call, ignore the call, or click a button to send a prerecorded message. If he decides to ignore the call, the caller is directed to a voice mail. The user may check his voicemail from his e-mail Inbox. He can listen to the voicemail by clicking a button or forward the voicemail to other people. VOX pops up a similar message window as in ACA. In VOX, the voice mail messages are retrievable from the phone set, just like the traditional voice mail.

Using ACA and VOX, if the user wants to record the caller's ID information into his address book associated with his Internet account, he has to copy the information or type the information into the address book and save it. This is inconvenient and it even may cause errors in transcribing.

What is desired is a mechanism with which the user may populate the caller's ID information to his host-based address book by one or more simple commands, such as a single click or double click of his mouse.

SUMMARY OF THE INVENTION

This invention provides a method to use already available caller's ID information in the Internet based telephone service to populate a host based address book. Because the caller's ID information is stored in a host based address book, it is available anywhere, from any phone, in the world if Internet access is possible. Strategically, the more addresses that are populated in an address book, the stickier that account is. If the address book is populated with more phone numbers, then it provides a basis for voice based dialing and other services.

By giving a simple command, such as a single click on a virtual button in the popup window provided by the Internet based telephone service, the caller's information is automatically populated to the host based address book. The address book stored in the user's PC and PDA can be synchronized whenever the device is connected to the Internet and the user logs on his Internet account. The synchronization may also be done wirelessly on cellular phones via "over the air" (OTA).

DETAILED DESCRIPTION OF THE INVENTION

Figure 1A:
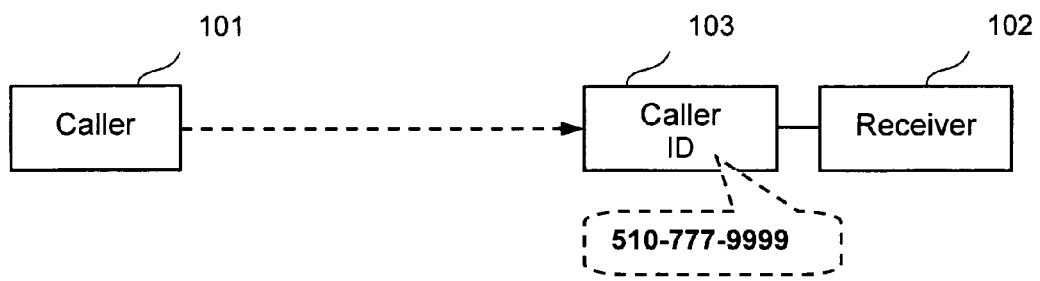
FIG. 1A is schematic block diagram illustrating a regular Caller ID device inserted into a telephone system according to the prior art.
Figure 1B:
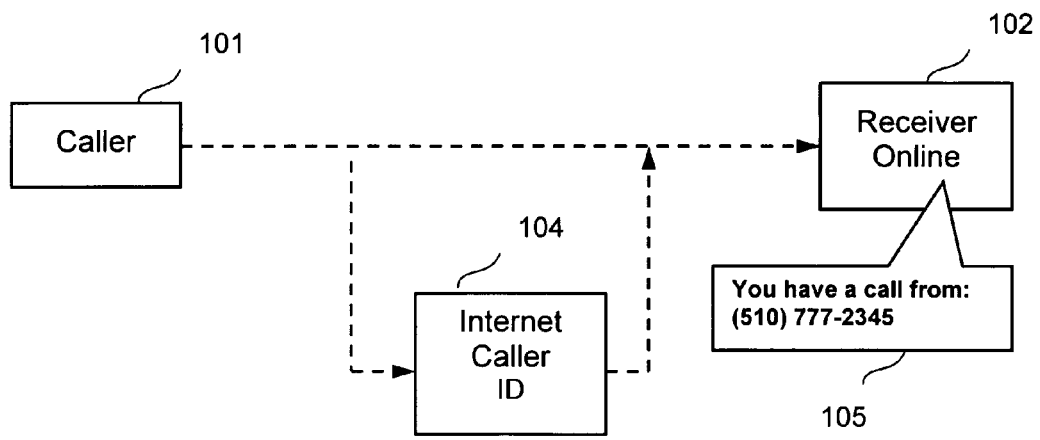
FIG. 1B is schematic block diagram illustrating an Internet Caller ID inserted into the telephone system according to the prior art.
Figure 2:
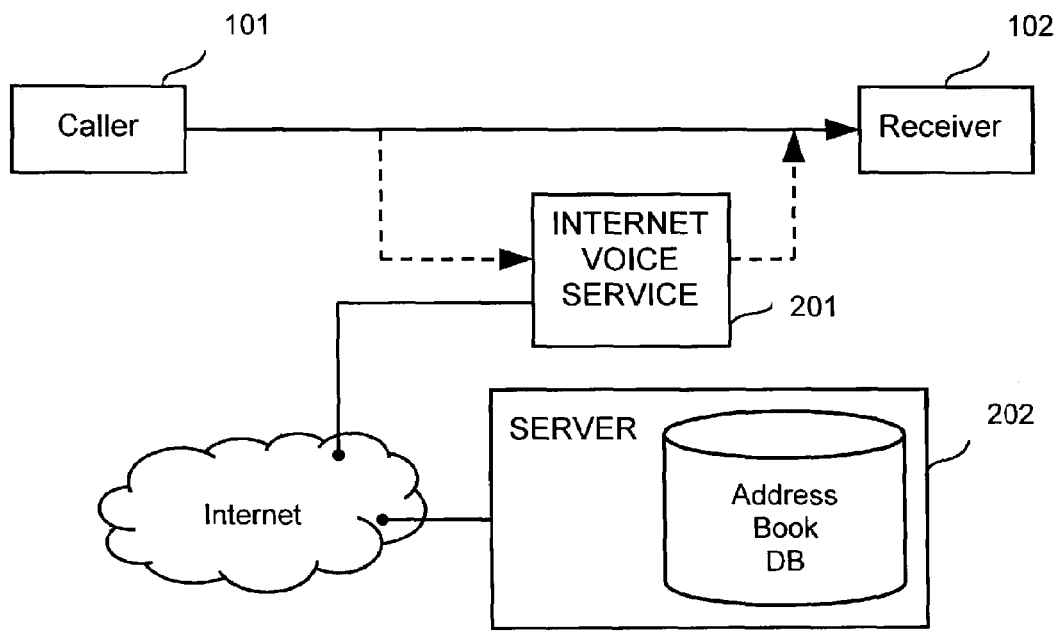
FIG. 2 is schematic block diagram illustrating a comprehensive Internet Voice Service inserted into a telephone system according to the invention.

FIG. 2 is block schematic diagram illustrating a telephone service system wherein an Internet enabled Voice Service 201 is inserted into all inbound and outbound member telephone. The Server 202 maintains in its database a host-based address book for each member.

Figure 3:
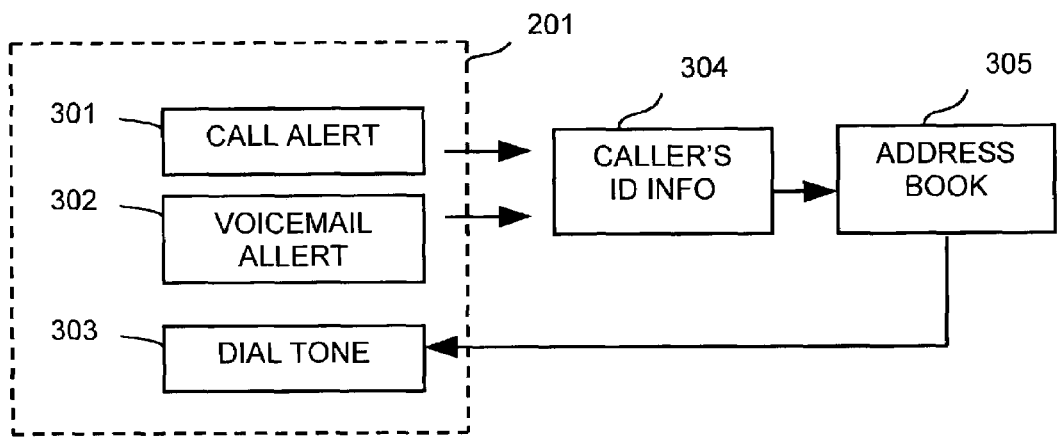
FIG. 3 is a block diagram illustrating the scheme to populate a caller's ID information to a host-based address book and dial a call from the address book.

FIG. 3 further illustrates the operations of the system in FIG. 2. The Voice Service 201 may comprise a Call Alert (inbound) 301, a Voicemail Alert (inbound) 302, and a dial-tone with voice activated dialing (outbound) 303. Both the Call Alert 301 and the Voicemail Alert 302 provides a Caller ID popup window 304 which shows the realtime phone information including the caller's name, phone number, city and state as well as the time when he called. The user can add the real time phone information to his host based address book by giving a simple command such as clicking a virtual button in the pop up window.

Call Alert 301 is a service that allows the user to never miss a call when he is online. It notifies the user of incoming calls as they happen when the user residential phone line is connected to the Internet with the Server 202. Call Alert 301 uses a feature of the user's telephone service known as Call Forward Busy. When someone calls the user when he is online with the Server 202, the call is directed to the Call Alert. A Caller ID Window 304 pops up on the user's computer screen, notifying him of an incoming call. The window shows him the name, number, city, and state of the calling party (where Caller ID is available). The user is then given several choices on how to handle the call. For examples:

- Take a message. The caller is prompted to leave a message for the user. If a message is left, the user is notified with a message alert window that gives him the option to listen to the message right away. In addition, messages are sent to the user's Inbox, allowing him to listen to, forward and save the message.
- Send a sessage. The user can play 1 of several prerecorded messages for the caller. For example, the user may choose "I'll call you back", "Please call later", "Try my cell", or "Don't know you". He is able to set a preference for which of the above actions is activated for calls that come in if he is away from the computer or do not see the alert window in time to select an action.
- Ignore call. The caller hears continuous ringing so that the user can stay online in complete privacy.

To sign up for the call alert service, the user needs to go through a short registration process. To complete the registration, the user needs to call the toll-free number given from his home phone number. This step is required by the local phone company in order to confirm he is the owner of the home phone number he has requested the Call Alert on. Note that if the line the user is online with is the same line that he wants forwarded (which it usually is), then the user is not required to go through the step of calling in. The user's order is then sent to his phone company so they can add a call forwarding feature to his phone line (the feature is "Call Forward Busy"). The Call Forward Busy service forwards incoming calls that receive a busy signal while the user is online, allowing Call Alert to give him notice of the call on his computer screen.

Call Alert 301 complements the user's answering machine and other networked devices. While the user is online, it handles the busy calls by giving him notice of the calls. While he is offline, it leaves unanswered calls to his answering machine as usual. Any networked PC or TV that is enabled with text voicemail alerts can be programmed to use speech to tell the user the real time caller identification information. This allows the user hear the caller identification information while he is in the proximity of an enabled PC or TV. While a call is coming in, the user may pick up the phone to hear the name and number of the caller and then decide to accept the call or send it to voicemail, or he can order to add the caller's information to the host-based address book.

Voicemail Alert 302 is a service that notifies the user of voicemails. The user may check the messages via phone by calling a number or via logging on his account with the Server 202 when the user residential phone line is connected to the Internet. Same as Call Alert 301, a Caller ID Window 304 pops up on the user's computer screen, notifying him of the name, telephone number, city and state of the calling party. The user's incoming e-mails and voice mails are all stored in his Inbox. The user may listen to the message by simply clicking the button "Listen", or forward the voicemail message to as many people as he likes, just like forwarding an e-mail, all at the same time. The user may also save the voicemail message for future review.

Address Book Dialing 303 is a service that allows the user to use the speech recognition of the voice platform as the user interface to initiate a telephone call to a person listed in the host-based address book. For example, a user may simply say "Call Mom" and his Mom's number is dialed.

Figure 4:
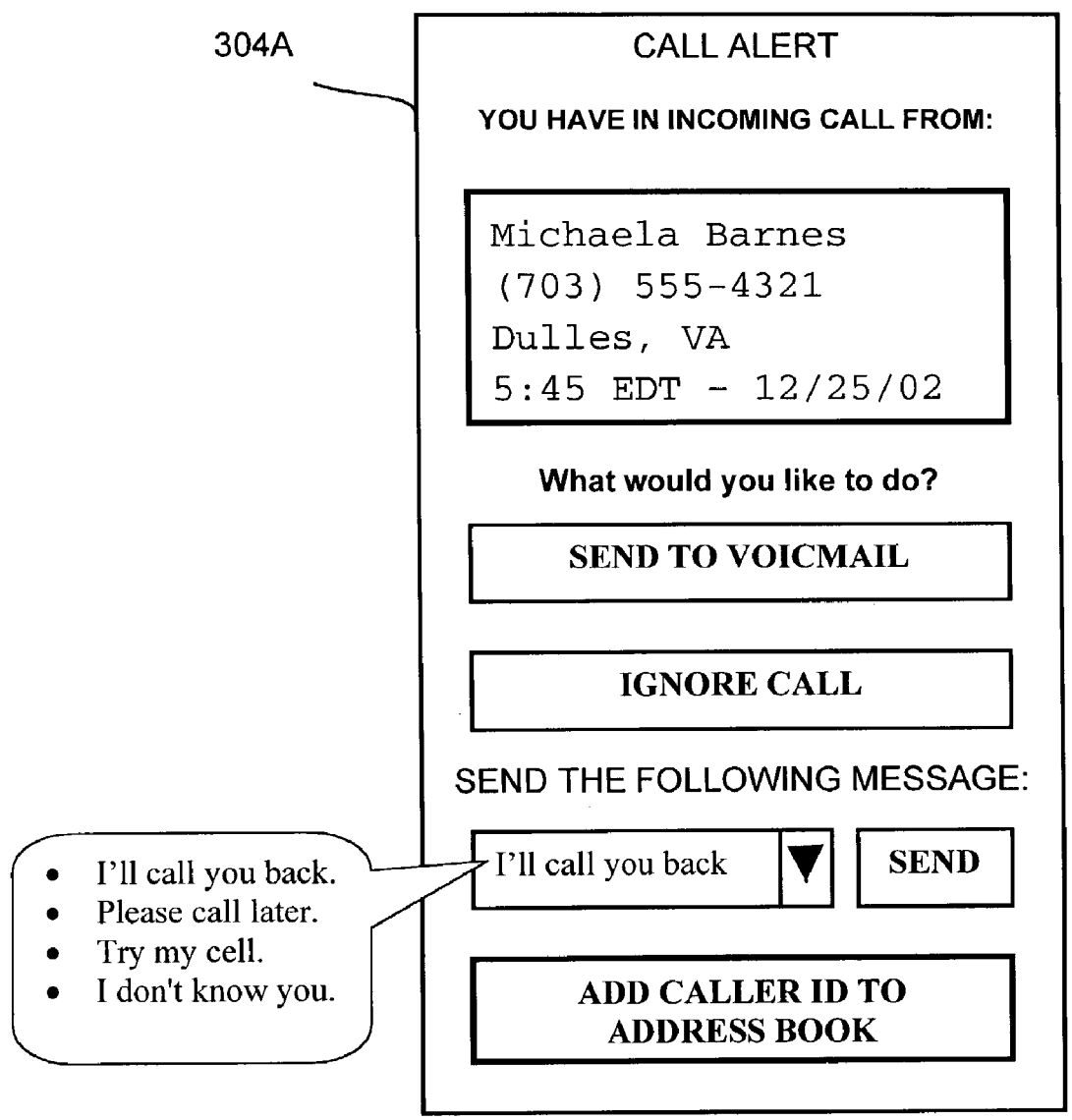
FIG. 4 is schematic diagram illustrating a sample popup window supported by Call Alert Service.

FIG. 4 is a schematic diagram illustrating a sample Call Alert popup window 304A. The user can add the caller's information to his host based address book by simply clicking a button called, for example, "Add Caller ID To Address Book". The user may give a series of commands to complete the population. For example, by typing and clicking, the user modifies and adds the information to be populated. Alternatively, the system may complete the population automatically without the user's intervention whenever a new caller is identified or a registered caller's new data such as phone number is identified.

Figure 5:
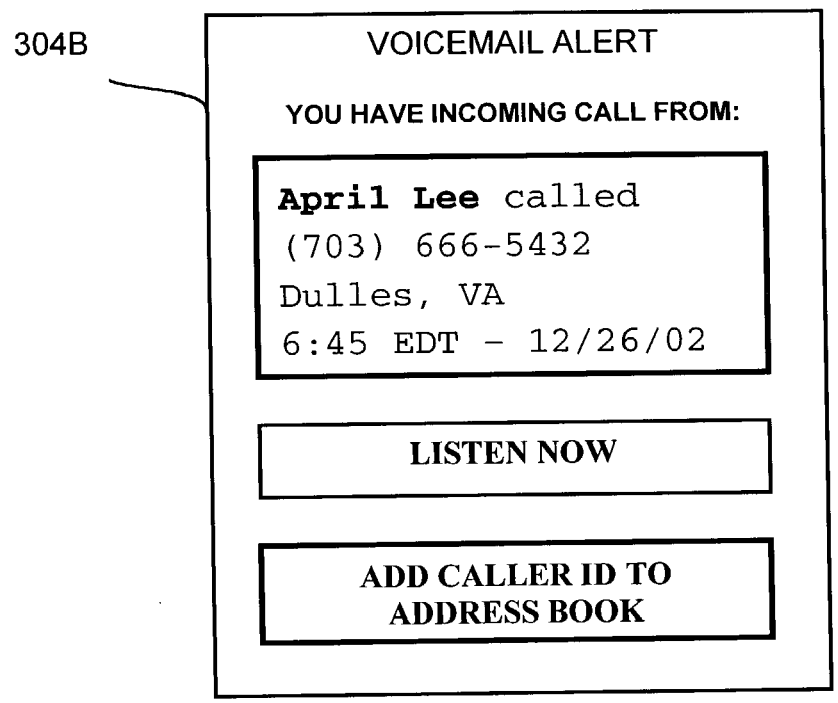
FIG. 5 is schematic diagram illustrating a sample popup window supported by Voicemail Alert Service.

FIG. 5 is a schematic diagram illustrating a sample Voice Alert popup window 304B. Alternatively, an Avral™ or other technique may be used to alert the user. The user can add the caller's information to his host based address book by simply clicking a button called, for example, "Add Caller ID To Address Book". The user may give a series of commands to complete the population. For example, by typing and clicking, the user modifies and adds the information to be populated. Alternatively, the system may complete the population automatically without the user's intervention whenever a new caller is identified or a registered caller's new data such as phone number is identified, or the user may populate such information by voice command.

Figure 6A:
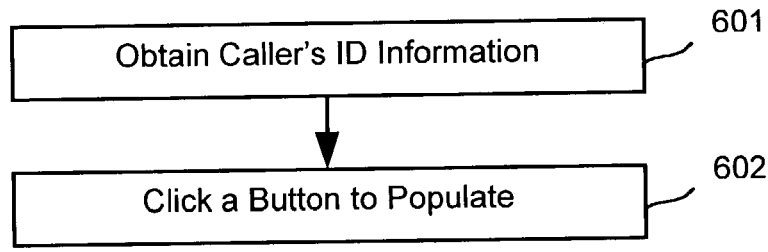
FIG. 6A is a flow diagram illustrating a method for populating a caller's information to a host-based address book.

FIG. 6A is a flow diagram illustrating a method for populating a caller's information to a host-based address book according to the first preferred embodiment of the invention. The method comprises the following steps:

Step 601: Obtaining the caller's identification information from an incoming call signal. The caller's identification information may include but is not limited to, caller's name, telephone number, city and state where the caller called from, and Step 602: Clicking a virtual button to give a command to populate the obtained caller's identification information to a host-based address book. The user may give further commands to modify the information to be populated.

Figure 6B:
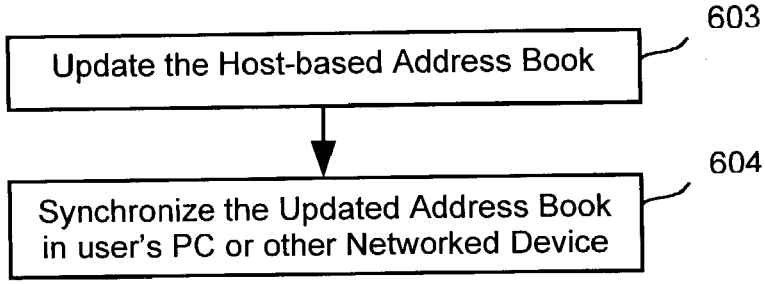
FIG. 6B is a flow diagram illustrating further steps of the method illustrated in FIG. 6A.

FIG. 6B is a flow diagram illustrating further steps of Step 602 described above:

Step 603: Updating the host-based address book via the computer which is connected to the Internet via the telephone line; and Step 604: Synchronizing the address books stored in any device such as PC, PDA, cellular phone, etc., which are connected to the Internet.

Figure 7:
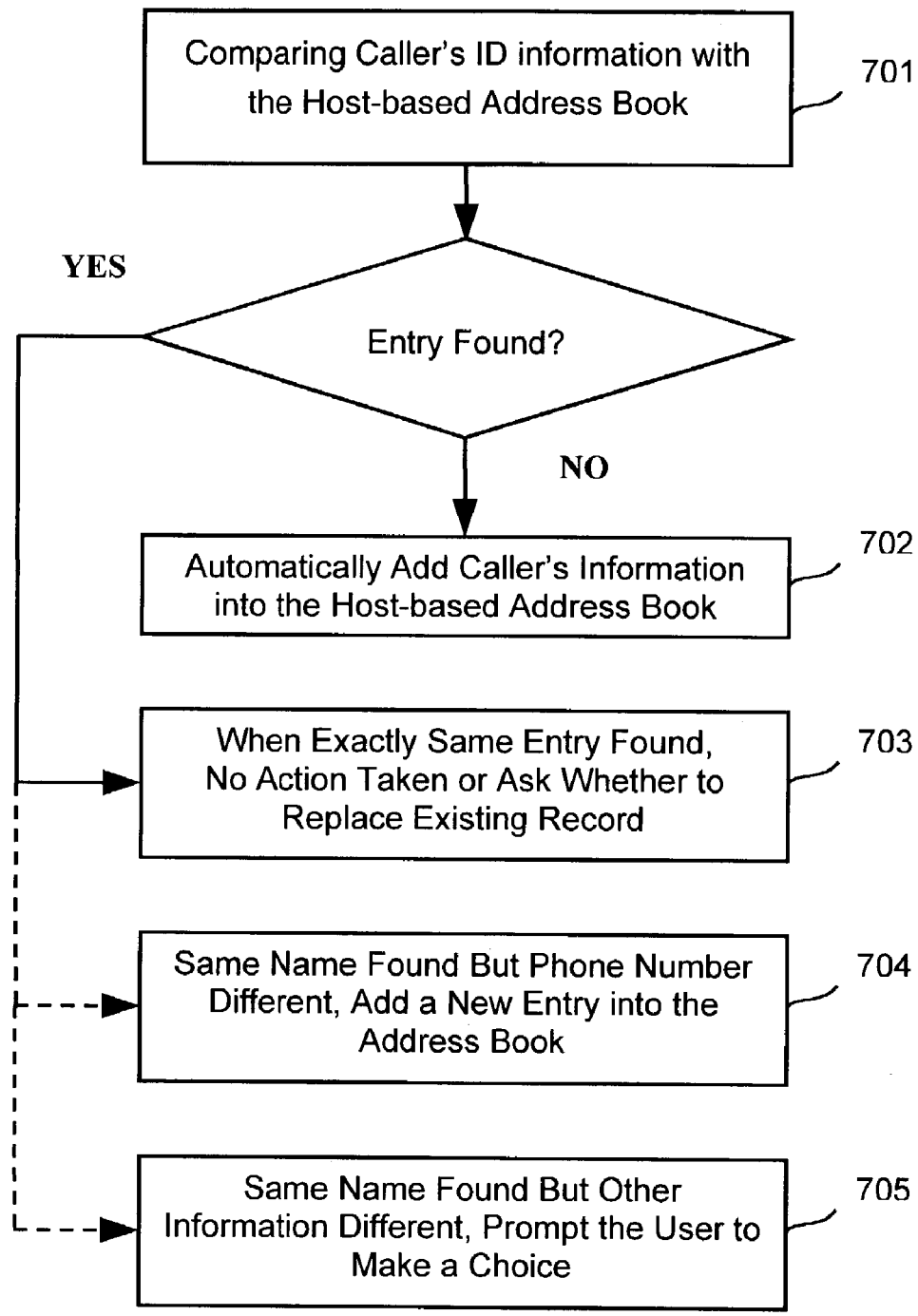
FIG. 7 is a flow diagram illustrating a method according to an equally preferred embodiment of the invention wherein the caller identification information extracted from an inbound call is automatically populated to the host-based address book without the user's intervention.

FIG. 7 is a flow diagram illustrating a method according to an equally preferred embodiment of the invention wherein the caller identification information extracted from an inbound call is automatically populated to the host-based address book without the user's intervention. The method comprises the steps of:

Step 701: Compare a caller's ID information with the host-based address book;

Step 702: If the caller's name is not found from the address book, automatically add his information into the address book;

Step 703: If an exactly same entry is found in the address, no action is needed, or simply ask the user whether he wants to replace the existing record;

Step 704: If the caller's name is found but the telephone number under the name in the address book is different from that of the caller's, automatically add the the caller's information into the address book as a new entry;

Step 705: Alternatively, if the caller's name is found but other information under the name in the address book is different from that of the caller's, pop up a prompt window asking the user to make other choices.

Figure 8:
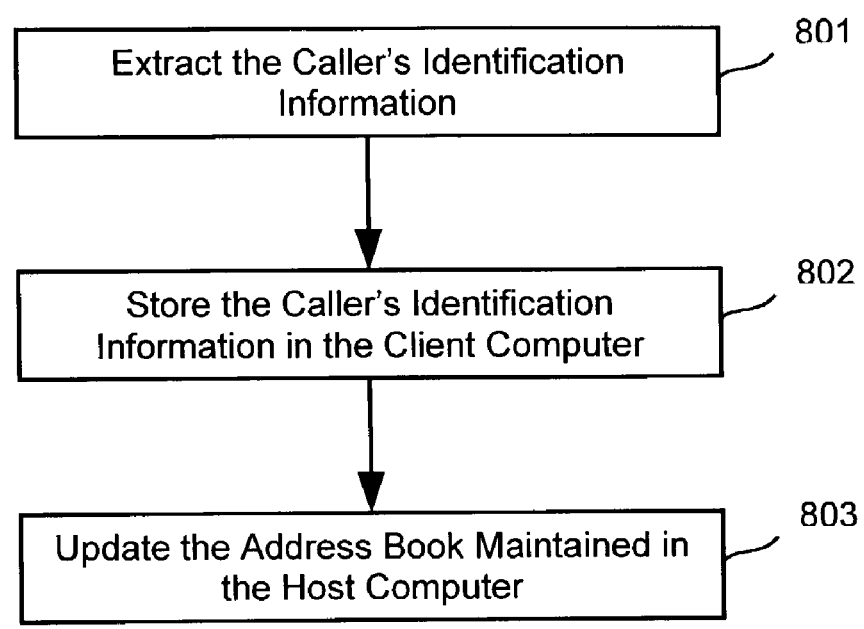
FIG. 8 is a flow diagram illustrating a method according to another equally preferred embodiment of the invention wherein a client computer first stores the extracted caller identification information before update the host-based address book.

FIG. 8 is a flow diagram illustrating a method according to another equally preferred embodiment of the invention. The method comprises the steps of:

Step 801: Extracting a caller's identification information transmitted in conjunction with an attempted initiation of a telephone call to a telephone line connected to a receiver's telephone, the telephone line being connected to a client computer with which the user may access his Internet account maintained by a host computer;

Step 802: Store the caller's identification information into the client computer; and Step 803: Update the user's address book associated with his Internet account by the client computer based on the stored caller's identification information.

The methods described above may further include a step for automatically updating individual address changes in every member's address book. This is based on a publish and subscribe model, i.e. there is only one database record of the address that many people subscribe to. Family, friends, business associates can link to a user's address, automatically get an update to their host address book, and then have the update sychronized to all PIMs and PDAs. Given the member information already on file, the connected address book may be sent to millions of members. The addresses for all the members in a member's buddy list can also be populated.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. A method for populating a personal online contacts directory associated with a users online services account, comprising operations of:
   an online services provider providing multiple Internet accessible, user configurable, personal online contacts directories each associated with a user's online services account;
   establishing service for users' telephone lines such that incoming calls to each said line are redirected to the online services provider under prescribed conditions, the prescribed conditions including the incoming calls occurring while the line is busy;
   responsive to the online services provider receiving redirection of an incoming call placed to a user, where the redirection occurs while the user is logged-in to the online services provider, performing operations comprising:
      the online services provider transmitting a substantially real-time interactive indication of the incoming call to the user via computer by which the user is logged-in to the online services provider;
      the online services provider utilizing caller-ID data received in conjunction with the incoming call to extract information identifying a party who placed the incoming call;
      the online services provider updating the user's personal online contacts directory to include at least part of the extracted information, where updating occurs responsive to one of the following: (1) automatically, (2) responsive to user direction submitted via the interactive indication of the incoming call.

2. The method of claim 1, further comprising:
synchronizing contents of the following: (1) the user's personal online contacts directory, and (2) a local contacts directory stored in one of the following: the user's computer, a different local device in communication with the user's computer.

3. The method of claim 1, where the operation of the online services provider updating the user's personal online contacts directory to include at least part of the extracted information comprises:
   updating a local contacts directory stored in one of the following: the user's computer, a different local device in communication with the user's computer;
   synchronizing contents of the user's personal online contacts directory and the local contacts directory.

4. The method of claim 1, where the operation of the online services provider transmitting a substantially real-time interactive indication of the incoming call comprises:
   causing a pop-up window containing the indication to display upon the user's computer.

5. The method of claim 1, where:
   the operation of the online services provider transmitting a substantially real-time interactive indication of the incoming call comprises: causing a window containing the indication to display upon the users computer;
   the operation of the online services provider updating the user's personal online contacts directory to include at least part of the extracted information occurs responsive to the user selecting a prescribed graphical feature presented by the window.

6. The method of claim 1, where:
   the operation of establishing service comprises: arranging a call-forward-busy feature.

7. The method of claim 1, where the extracted information comprises at least one of the following:
   name of the party;
   telephone number of the party;
   city of the party;
   state of the party;
   time at which the incoming call was placed.

8. The method of claim 1, the prescribed conditions further including: the incoming call occurring without being unanswered.

9. A method for populating a personal online contacts directory associated with a user's online services account, where an online services provider provides multiple Internet accessible, user configurable, personal online contacts directories each associated with a user's online services account, and where service has been established for users' telephone lines such that incoming calls to each said line are redirected to the online services provider under prescribed conditions, the prescribed conditions including the incoming calls occurring while the line is busy, the method comprising operations of:

responsive to the online services provider receiving redirection of an incoming call placed to a user, where the redirection occurs while the user is logged-in to the online services provider, performing operations comprising:

the online services provider transmitting a substantially real-time interactive indication of the incoming call to the user via computer by which the user is logged-in to the online services provider;

the online services provider utilizing caller-ID data received in conjunction with the incoming call to extract information identifying a party who placed the incoming call;

the online services provider updating the users personal online contacts directory to include at least part of the extracted information, where updating occurs responsive to one of the following: (1) automatically, (2) responsive to user direction submitted via the interactive indication of the incoming call.

10. A method for populating a personal online contacts directory associated with a user's online services account, comprising operations of:

an online services provider providing multiple Internet accessible, user configurable, personal online contacts directories each associated with a user's online services account;

establishing service for users' telephone lines such that incoming calls to each said line are redirected to the online services provider under prescribed conditions;

responsive to the online services provider receiving redirection of an incoming call placed to a user, the online services provider utilizing caller-ID data received in conjunction with the incoming call to extract information identifying a party who placed the incoming call;

responsive to the party leaving a voicemail message at the online services provider, the online services provider performing operations comprising:

while the user is logged-in to the online services provider, transmitting an interactive indication of the voicemail message to the user via computer by which the user is logged-in to the online services provider;

the online services provider updating the users personal online contacts directory to include at least part of the extracted information, where updating occurs responsive to one of the following: (1) automatically, (2) responsive to user direction via the interactive indication of the voicemail message.

11. The method of claim 10, further comprising:
synchronizing contents of the following: (1) the user's personal online contacts directory, and (2) a local contacts directory stored in one of the following: the user's computer, a different local device in communication with the user's computer.

12. The method of claim 10, where the operation of the online services provider updating the personal online contacts directory to include at least part of the extracted information comprises:

updating a local contacts directory stored in one of the following: the user's computer, a different local device in communication with the user's computer;

synchronizing contents of the user's personal online contacts directory and the local contacts directory.

13. The method of claim 10, where the operation of the online services provider transmitting an interactive indication of the voicemail message to the user comprises:

causing a window containing the indication to display upon the user's computer.

14. The method of claim 10, where:

the operation of the online services provider transmitting an interactive indication of the voicemail message to the user comprising: causing a window containing the indication to display upon the user's computer;

the operation of the online services provider updating the user's personal online contacts directory to include at least part of the extracted information occurs responsive to the user selecting a prescribed graphical feature in the window.

15. The method of claim 10, where:

the operation of establishing service comprises: arranging a call-forward-busy feature.

16. The method of claim 10, where the extracted information comprises at least one of the following:

name of the party;

telephone number of the party;

city of the party;

state of the party;

time at which the incoming call was placed.

17. The method of claim 10, the prescribed conditions including:

the incoming call occurring without being unanswered.

the incoming call occurring while the line is busy.

18. A method for populating a personal online contacts directory associated with a user's online services account, where an online services provider provides multiple lnternet accessible, user configurable, personal online contacts directories each associated with a user's online services account, and where service has been established for users' telephone lines such that incoming calls to each said line are redirected to the online services provider under prescribed conditions, the method comprising operations of:

responsive to the online services provider receiving redirection of an incoming call placed to a user, the online services provider utilizing caller-ID data received in conjunction with the incoming call to extract information identifying a party who placed the incoming call;

responsive to the party leaving a voicemail message at the online services provider, the online services provider performing operations comprising:

while the user is logged-in to the online services provider, transmitting an interactive indication of the voicemail message to the user via computer by which the user is logged-in to the online services provider;

the online services provider updating the user's personal online contacts directory to include at least part of the extracted information, where updating occurs responsive to one of the following: (1) automatically, (2) responsive to user direction via the interactive indication of the voicemail message.

19. An apparatus for populating a personal online contacts directory associated with a users online services account, where service has been established for users' telephone lines such that incoming calls placed to each said line are redirected to the online services provider under prescribed conditions, the prescribed conditions including the incoming calls occurring while the line is busy, the apparatus comprising:

at least one server configured to operate as an online services provider by performing services comprising:

providing multiple Internet accessible, user configurable, personal online contacts directories each associated with a users online services account;

responsive to the online services provider receiving redirection of an incoming call to a user occurring because the user's line is busy, performing operations comprising:

while the user is logged-in to the online services provider, transmitting a substantially real-time interactive indication of the incoming call to the user via computer by which the user is logged-in to the online services provider;

utilizing caller-ID data received in conjunction with the incoming call to extract information identifying a party who placed the incoming call;

updating the user's personal online contacts directory to include at least part of the extracted information, where updating occurs responsive to one of the following: (1) automatically, (2) responsive to user direction submitted via the interactive indication of the incoming call.

20. The apparatus of claim 19, where the interactive indication of the incoming call comprises:

a virtual button included in a popup window;

a mechanism to associate a single-click on said virtual button with a command to order said sewer to perform said operation of updating the user's personal online contacts directory.

21. An apparatus for populating a personal online contacts directory associated with a user's online services account, where service has been established for users' telephone lines such that incoming calls to each said line are redirected to the online services provider under prescribed conditions, the apparatus comprising:

at least one server configured to operate as an online services provider by performing services comprising:

providing multiple Internet accessible, user configurable, personal online contacts directories each associated with a users online services account;

responsive to the online services provider receiving redirection of an incoming calls placed to a user, the online services provider utilizing caller-ID data received in conjunction with the incoming call to extract information identifying a party who placed the incoming call;

responsive to the party leaving a voicemail message at the online services provider, the online services provider performing operations comprising:

while the user is logged-in to the online services provider, transmitting an interactive indication of the voicemail message to the user via computer by which the user is logged-in to the online services provider;

the online services provider updating the user's personal online contacts directory to include at least part of the extracted information, where updating occurs responsive to one of the following: (1) automatically, (2) responsive to user direction via the interactive indication of the voicemail message.

22. The apparatus of claim 21, where the interactive indication of the incoming call comprises:

a virtual button included in a popup window;

a mechanism to associate a single-click on said virtual button with a command to order said server to perform said operation of updating the user's personal online contacts directory.

* * * * *